United States Patent [19]

Cole

[11] 4,450,687
[45] May 29, 1984

[54] TEMPERATURE RESPONSIVE ACTUATING DEVICE

[75] Inventor: Albert Cole, Keswick, England

[73] Assignee: Thermoforce Limited, Cockermouth, England

[21] Appl. No.: 381,689

[22] Filed: May 25, 1982

Related U.S. Application Data

[63] Continuation of Ser. No. 130,730, Mar. 17, 1980, abandoned.

[51] Int. Cl.³ .............................................. F03G 7/06
[52] U.S. Cl. .................................. 60/530; 236/101 R
[58] Field of Search ........................ 60/527, 530, 531; 236/99 R, 100, 101 R

[56] References Cited

U.S. PATENT DOCUMENTS 3,330,480  7/1967  Drapeau et al. .................... 236/100
4,140,017  2/1979  Cole et al. ............................. 60/530

Primary Examiner—Allen M. Ostrager
Attorney, Agent, or Firm—Wm. T. Wofford; James C. Fails; Arthur F. Zobal

[57] ABSTRACT

The invention relates to a temperature responsive control assembly which uses the volumetric expansion of a substance having a high coefficient of expansion, to expel a piston from a cylinder, such movements of the piston relative to the cylinder being used to control relative movements between first and second load elements, such as for example a window and a window frame, with the cylinder being connected to the first load element and the piston being connected by way of a high leverage operating linkage with the second load element, and wherein the thermally expansive substance is located in the cylinder between end plugs and the piston passes through one of the end plugs there being shaft seal means carried by the end plug and sealing around the piston passing through it, the piston having its inboard end immersed in the thermally expansive substance. The invention is characterized in that the piston bears axially with its outboard end upon an inboard end of a push rod which can be moved separately from and independently of the piston and which is guided for axial sliding movements, generally in line with the axis of movements performed by the piston, this push rod being connected and arranged to transmit control forces between the piston and the high leverage operating linkage operatively interconnecting the piston with the second load element.

5 Claims, 3 Drawing Figures

TEMPERATURE RESPONSIVE ACTUATING DEVICE

This is a continuation of application Ser. No. 06/130,730, filed Mar. 17, 1980, now abandonned.

This invention relates to temperature responsive devices of the kind utilizing the volumetric expansion of substances or compositions having high coefficients of thermal expansion. Typical of such substances are waxes or jellies, and in particular a mixture of paraffin wax and petroleum jelly. The volumetric expansion and contraction of such substances occurring when there is a change in the ambient temperature is employed to operate mechanisms such as bell cranks or linkages, say for controlling ventilators, windows, fanlights, shutters, valves and so forth.

Temperature responsive actuating devices which utilize the volumetric expansion and contraction of a substance have been proposed for example in U.S. Pat. No. 4,140,017. Such a device essentially includes a straight tubular cylinder containing the substance and immersed in said substance a rod which is constituted as a piston and extends into the cylinder through a close fitting guide means incorporating a shaft seal. The piston passes through a bush which constitutes a means for allowing controlled axial sliding movement to the piston. This bush incorporates the shaft seal means engaging about the piston rod. The rod extends axially out of one end of the cylinder and is connected to the ventilator pane, for example by means of a linkage.

This piston must be of a diameter such that on the one hand adequate shaft sealing is obtained (this limiting the minimum dimension) while if the piston is large in relation to the diameter of the cylinder, there will be inadequate axial piston movement for a given volumetric change consequent upon change of ambient temperature.

In use the cylinder is adapted to be connected rigidly to a fixed frame with respect to which the ventilator pane is movable. For example the ventilator pane may be a window pivoted on the frame. The linkage is arranged to transmit to the movable pane the axial movements performed by the piston rod, on expansion or contraction of the temperature responsive substance contained within the cylinder.

The linkage is arranged to transmit these movements at a high leverage of say 10:1 or more (with 1 cm of piston movement corresponding to at least 10 cm of movement of the movable pane relative to the fixed frame). If then a force of 10 kg is required to move the window pane, a corresponding force of 100 kg must be exerted on and by the piston.

The piston rod is then required to move axially when subjected to high axial loadings transmitted through the linkage. The bush incorporating the shaft seal supports such axial sliding movement of the piston rod and the shaft seal prevents the escape of the thermally expansive substance from within the cylinder. This substance is commonly a mixture of paraffin wax and petroleum jelly. Upon expanding it may generate pressures of 35 MN/m$^2$ or more. The shaft seal bears tightly upon the piston and so contributes frictional forces which have to be overcome when the piston is moved axially. However, in the known devices these frictional forces are supplemented by lateral forces due to the geometry of the linkage arranged to transmit forces from and to the actuator, which lateral forces generate further friction in the guide means supporting the piston for axial sliding movement.

One further disadvantage which arises with the known devices is due to the fact that during installation the piston is often moved much more rapidly than when the device is functioning in its operative installed condition. This has in some cases adversely effected the seals and has led to a reduction in their durability.

One object of the present invention is to provide an actuator of the general kind discussed above in which the likelihood of the piston being moved rapidly to-and-fro during installation is reduced.

The present invention has for another object to provide that little or no lateral force is transmitted to the piston.

To this end the invention provides that instead of the piston rod being connected directly to the high leverage operating linkage as in previously proposed devices, the arrangement is that the piston bears axially with its outboard end on a separate push rod which is guided for axial sliding movement, the push rod being connected to the linkage.

Accordingly there is provided, according to this invention, a temperature responsive control assembly which uses the volumetric expansion of a substance having a high coefficient of expansion, to expel a piston from a cylinder, such movements of the piston relative to the cylinder being used to control relative movements between first and second load elements, such as for example a window and a window frame, with the cylinder being connected to the first load element and the piston being connected by way of a high leverage operating linkage with the second load element, and wherein the thermally expansive substance is located in the cylinder between end plugs and the piston passes through one of the end plugs there being seal means carried by the end plug and sealing around the piston passing through it and has its inboard end immersed in the thermally expansive substance. The invention is characterised in that the piston bears axially with its outboard end upon the end of a push rod which can be moved independently of the piston and which is guided for axial sliding movements, generally in line with the axis of movements performed by the piston, this push rod being connected and arranged to transmit control forces between the piston and the high leverage operating linkage interconnecting the piston with the second load element.

According to a preferred feature of the invention the guiding means for the push rod are separate and axially spaced from the guiding means for the piston, the first mentioned guiding means being constituted by a bore in a cap screwed to one end of the cylinder and the second guiding means being constituted by a bore in the plug through which the piston passes, and wherein a stop is provided on each of the piston and the push rod to ensure that the end to end abutting interface between the two is maintained within the cylinder between the first and second above mentioned guiding means.

Preferably the guiding means supporting the push rod has an axial length which is at least as long as the diameter of the rod but not more than twice the diameter. For example, where the push rod has a diameter of 7.5 mm its bearing will have an axial length of 10 mm.

Advantageously the guiding means supporting the piston has an axial length which is at least twice the diameter of the piston. For example, where the piston has a diameter of 5 mm its bearing may have an axial length of at least 10 mm.

The stop means on the push rod and on the piston are preferably circlips.

The end plug through which the piston passes is adjustable as to its position axially of and within the cylinder, and because of the separation of the bearings for the piston and push rod, any adjustment made will not have any effect upon the frictional forces which tend to oppose piston movements.

The end plug located in the cylinder and separated from the piston by the thermally expansive substance is adjustable as to its position axially of and within the cylinder, so that the device may be adjusted in its position of use, connected and arranged to control the opening and closing of a window pane for example. Such adjustment will be effected by manual rotation of a screw threaded end cap with movement being transmitted to the plug by a spacer sleeve.

Preferably the piston and the push rod are aligned and bear on one another end to end. There is a straightforward separable metal-to-metal abutting contact which may be lubricated at the end to end abutting interface. This arrangement ensures that any lateral loadings generated in the actuating rod are not transmitted to the piston and indeed the rod can be withdrawn from contact with the piston. Moreover, the design of the piston, the cylinder and the shaft seal can now be chosen such as to obtain a fast response to volumetric expansion coupled with adequate sealing and adequate axial movement of the piston. The problems of friction or so-called "striction" are no longer accentuated by the generation of forces in a bearing or guide for the piston itself intended to cater for non-axial forces. The actuating rod and the piston rod may be of different materials and may have different diameters and although they will be in general alignment, exact axial alignment of the two, although desirable, is of no great importance. The piston will be of high quality corrosion resistance steel. The push rod need not be of such expensive material, nor need it be machined so accurately.

The invention will be described by way of example with reference to the accompanying drawings in which:

FIG. 2 is a cross-sectional view of the actuator according to the invention; while

Figure 1:
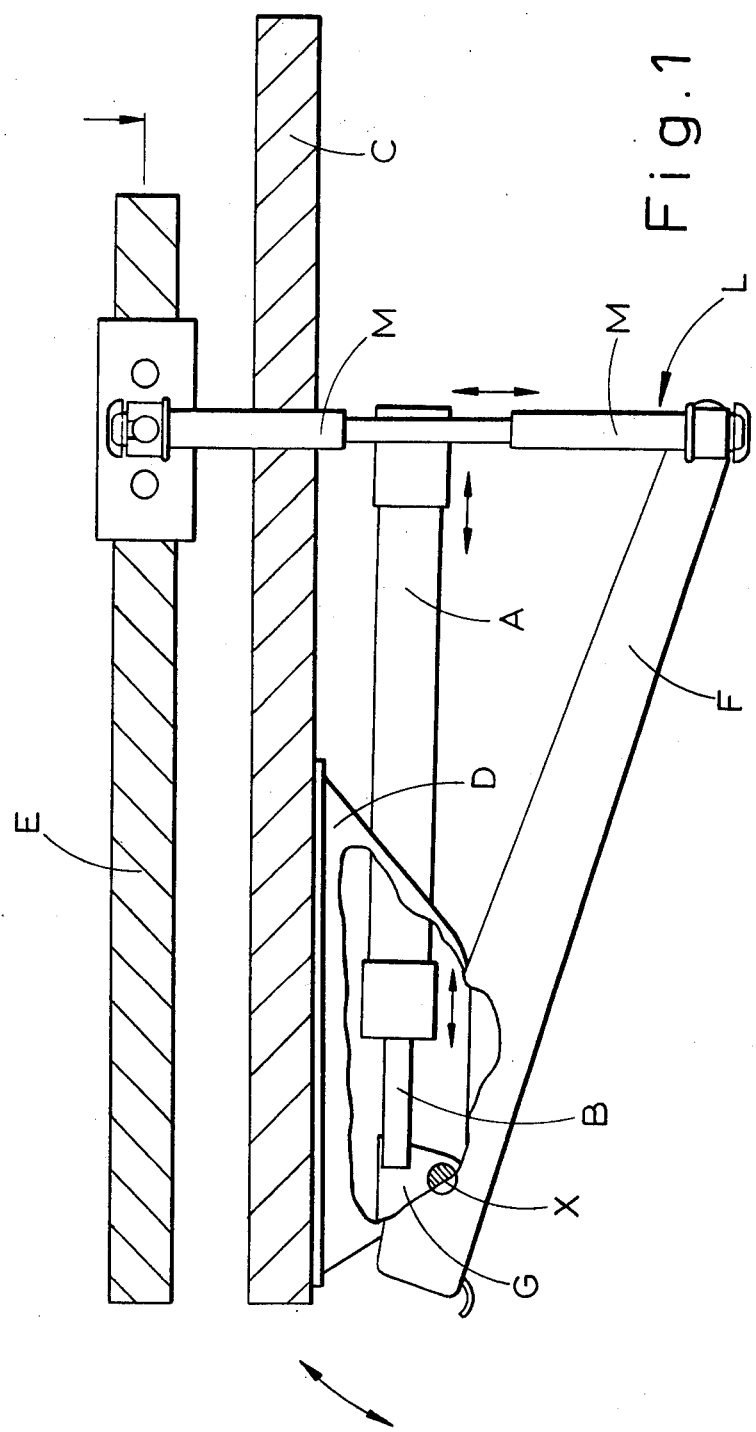
FIG. 1 shows diagrammatically a temperature responsive device as fixed in a known operative arrangement for controlling pivotal movement of a ventilator pane relative to a fixed frame.

Referring first to FIG. 1, there is here shown a known operative arrangement between first and second load elements for a temperature responsive actuator. As shown, a cylinder unit A is filled with a substance which expands volumetrically as its temperature rises to expel a shaft B. The cylinder A is clamped to the first load element, viz. a frame member C, by means of a bracket D. Pivotally mounted on frame member C is the second load element, viz. a ventilator pane E. A crank F is pivotally mounted on bracket D to move about an axis X. The shaft B is connected to the crank F at joint G, and the free end of the crank F is connected to the pane E by an articulated linkage L whose length is adjustable by an adjustment device of any known kind, generally indicated at M. A return spring (not shown) is usually provided and which tends to turn crank F clockwise as seen on the drawing, such as to urge shaft B inwardly of cylinder A.

It will be noted from FIG. 1 that the crank F has a long arm and a short arm such that the load from the pane E is transmitted to the shaft B at a leverage of approximately 10:1. Moreover, it will be noted that the pivotal connection at joint G performs an arcuate movement about the pivotal axis X of the crank F. Due to this arcuate movement the shaft B is subjected to lateral loads in addition to the axial loads transmitted between the cylinder A and the ventilator pane E.

In one known device, which is as described in U.S. Pat. No. 4,140,017, the shaft B is constituted as a piston. It passes through a bush carried in the cylinder A which bush has a bore which serves as a guide means for supporting the piston for axial movement and this bore housed also shaft sealing means for engaging about the piston and for preventing the extrusion of the substance which expands when heated. Good sealing and guidance could only be obtained at the expense of high friction or striction forces tending to prevent fast response to temperature change. Good sealing may be adversely affected by rough treatment of the shaft seal during installation.

The present invention is concerned with the provision of an alternative and useful piston cylinder and push rod assembly for use in the arrangement shown in FIG. 1 in substitution for the elements A and B, and which overcomes many of the various problems set out hereinabove.

Figure 2:
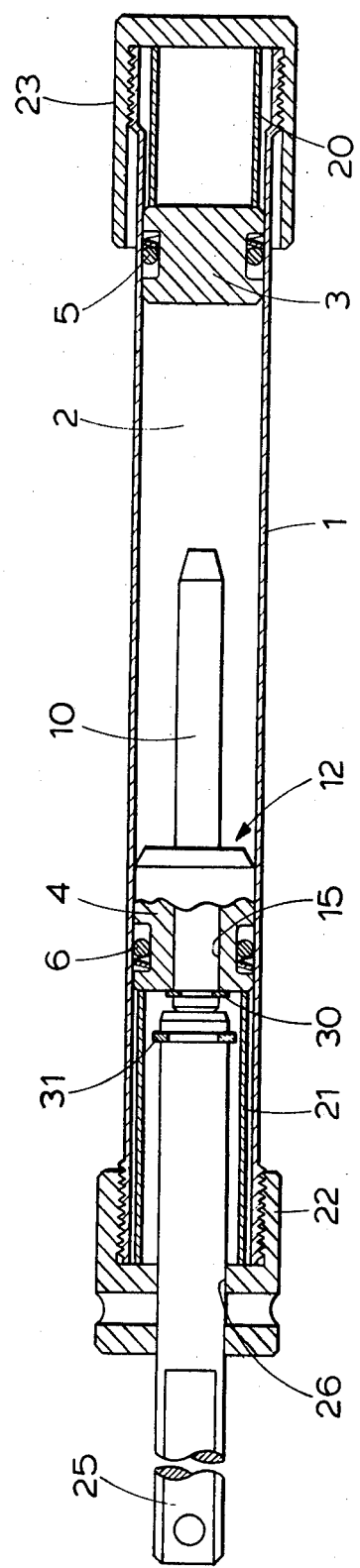

Accordingly, and referring now to FIG. 2, there is here shown an actuator unit provided according to the invention with a cylinder housing 1 which contains a substance 2 which expands with increasing temperature. A suitable substance would be a mixture of wax and petroleum jelly whose volume will increase by approximately 15% as its temperature rises from 10° C. to 55° C.

The substance 2 is contained with the cylinder 1 between two axially movable plugs 3 and 4, each provided with sealing means generally designated 5 and 6 operating as a sliding seal between their external peripheries and the cylindrical wall of the cylinder 1. Typically the sealing means 5 and 6 are constituted by an O-ring of elastomeric material supported at least on the low pressure side by anti-extrusion rings of polytetrafluorethylene (p.t.f.e.). The plugs 3 and 4 are of metal and are spaced from the ends of the cylinder 1 by means of metal sleeves 20 and 21 and threaded metal cap nuts 22 and 23. The cap nuts 22 and 23 may be screwed with respect to the threaded ends of the cylinder 1 to effect adjustment of the spacing between the plugs 3 and 4 and hence the volume within the cylinder 1 available for the substance 2.

A piston rod 10 extends axially through a central bore of the plug 4. A shaft seal, generally designated 12, is disposed within the plug 4 and seals about the piston 10 which is of high quality corrosion resistant steel, machined cylindrical to have a sliding clearance fit in the bore 15 of the plug 4. This bore constitutes an elongate bearing for guiding the piston 10 in its axial sliding movement. The inboard end of the piston 10 is immersed in the substance 2.

Figure 3:
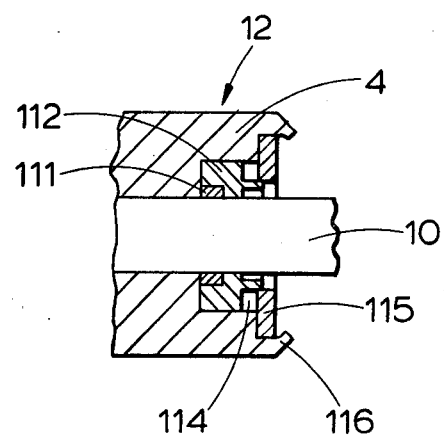
FIG. 3 is a detailed view, also in cross-section, of part of the actuator shown in FIG. 2.

The seal 12 is shown in detail in FIG. 3 and comprises two rings surrounding the piston 10. Firstly there is a ring 111 of p.t.f.e. which bears directly upon the piston 10. Surrounding the ring 111 is a second ring 112 of nitrile rubber. These two rings are located in a cylindrical cavity 114 formed within the plug 4 at the inner end of its through bore 15. The rings are also held within the cavity by a washer 115, suitably of brass, which is trapped behind turn-over lips 116 at the extremity of the cavity 114.

An important part of the sealing function is effected by a portion of the elastomeric ring 112 which extends into annular contact with the piston 10. The thermally responsive substance 2, when expanding, acts against this portion of the ring 112 and forces are generated in the elastomeric body so that it is urged against the walls of the cavity 114, against the anti-extrusion ring 111 and against the piston 10.

When the substance 2 contracts, residual hydrostatic sealing effect will be obtained from those forces which tend to urge the piston 10 inwardly of the cylinder. These forces may be loadings due inter alia to the return spring mentioned above acting upon the piston 10. However occurring, the pressures across the ring 112 will be of a low order when the substance 2 contracts.

According to a principal feature of the invention a separate push rod 25 is provided. The cap 22 has an axial opening constituting an elongate bearing 26 through which the cylindrical push rod 25 is guided for axial sliding movement. The inner end of the push rod 25 bears in metal-to-metal abutting contact with the end of the piston 10. The abutment interface may be lubricated.

The cylinder is adapted to be fixed to a frame. For example its cap nut 22 will be fixed to the bracket D in FIG. 1. The push rod 25 will then take the place of the shaft B of FIG. 1 and will be pivotally connected to the crank F.

The axial passage in the cap 22 will constitute a sliding bearing for supporting axial movement of the push rod 25 and lateral forces transmitted to the push rod 25 will be supported by the cap 22 and will be transmitted to the piston 10 only to a minor and acceptable extent. It will be appreciated that exact axial alignment of the piston 10 with the push rod 25 is not necessary and accordingly it is unnecessary to provide exact axial alignment between the bores in the cap 22 and the plug 4. As the shaft seal 12 in the plug 4 is not required to support significant lateral loadings, it can be much smaller than if lateral loadings were to be experienced. Consequently the piston 10 can be made of a relatively small diameter such that on the one hand adequate sealing is obtained around its periphery by the gland seal 12, while advantageously the piston will be small enough in relation to the diameter of the cylinder 1 that as the substance 2 expands or contracts the piston will perform useful working movements.

Rapid response to temperature change will be achieved if the diameters of the piston 10 and of the shaft seal 12 engaging therewith are small so that friction is low.

In a typical arrangement the bores 15 and 26 will each have an axial length of 10 mm, while the cylinder 1 might have an internal diameter of 15 mm and the piston might have a diameter of 5 mm. The push rod 25 might have a diameter of 7.5 mm. A typical volume for the substance 2 might be 25 cm$^3$ at 10° C., and when the temperature of the substance 2 increases from 10° C. to 55° C. its volume may increase to 28.75 cm$^3$ and so that a force of up to 35 MN/m$^2$ may be generated urging the piston 10 outwardly over a working stroke of say 2 to 3 cm.

The maximum stroke is governed by stop rings or circlips 30 and 31 provided on the piston 10 and push rod 25. These maintain the inboard end of the piston 10 immersed in the substance 2 and the abutting interface between cap 22 and plug 4.

The threaded caps 22 and 23 will allow adjustment during installation and the cap 23 may be rotated after installation to give adjustment as required for temperature calibration.

I claim:

1. A temperature responsive control device which utilizes a wax based substance which has liquid properties and a high coefficient of expansion, which substance is located, without provision for replenishment in service within a cylinder between two end plugs, both end plugs being equipped with peripheral sliding seals engaging with the wall of the cylinder and both end plugs being adjustable axially of the cylinder, a piston passing through one of the end plugs and having one end immersed in said substance and its other end operatively connected by way of a high leverage operating linkage with a first load element, the cylinder being connected to a second load element, the device effecting relative movement between said load elements with changes of temperature, with the piston being slidable in a shaft seal in the end plug through which it passes, and wherein, in order to prevent reduction of the sealing efficiency of the peripheral seal and of the shaft seal of that end plug through which it passes means are provided for shielding the outboard end of the piston from direct exposure to the environment, and the piston bears with its outboard end upon the inboard end of a push rod which can be moved separately and independently from the piston and which can transmit forces to the piston and to the end plug only axially, and wherein, in order to obtain improved response upon the occurrence of change of temperature causing change of volume of said substance contained in said cylinder, the bore of said cylinder is at least three times greater in diameter than said piston rod.

2. An assembly according to claim 1 further characterised in that the guiding means for the push rod are separate and axially spaced from the guiding means for the piston, the first mentioned guiding means being constituted by a bore in a cap screwed to one end of the cylinder and the second guiding means being constituted by a bore in the plug through which the piston passes, and wherein a stop is provided on each of the piston and the push rod to ensure that the end to end abutting interface between the two is maintained within the cylinder between the first and second above mentioned guiding means.

3. An assembly according to claim 2 further characterised in that the guiding means supporting the push rod has an axial length which is at least as long as the diameter of the rod but not more than twice the diameter.

4. An assembly according to claim 2 further characterised in that the guiding means supporting the piston has an axial length which is at least twice the diameter of the piston.

5. An assembly according to claim 2 further characterised in that the stop means on the push rod and on the piston are circlips.

* * * * *